United States Patent [19]
Aidlin et al.

[11] Patent Number: 4,802,569
[45] Date of Patent: Feb. 7, 1989

[54] TWO STATION ROBOTIC WELDER

[75] Inventors: Stephen H. Aidlin; Russell Bailey, both of Sarasota, Fla.

[73] Assignee: Aidlin Automation Corp., Sarasota, Fla.

[21] Appl. No.: 62,170

[22] Filed: Jun. 12, 1987

[51] Int. Cl.⁴ .............................................. B65G 47/00
[52] U.S. Cl. ................................ 198/346.1; 198/465.1
[58] Field of Search ........................ 198/346.1, 465.1; 29/33 P, 563; 901/15

[56] References Cited

U.S. PATENT DOCUMENTS

| | | | |
|---|---|---|---|
| 3,099,873 | 8/1963 | Bainard et al. | 198/465.1 X |
| 4,172,512 | 10/1979 | Clegg et al. | 198/346.1 |
| 4,482,043 | 11/1984 | Bauman et al. | 198/346.1 |
| 4,673,076 | 6/1987 | Mattson | 198/346.1 |
| 4,701,096 | 10/1987 | Fisher, Jr. | 198/346.1 X |
| 4,706,004 | 11/1987 | Komatsu et al. | 901/15 |

OTHER PUBLICATIONS

Origa Corporation Advertisement for Origa Cylinder Series 200 for 8 Bar 116 PSI Pneumatics.

Primary Examiner—Frank E. Werner
Assistant Examiner—Cheryl L. Gastineau
Attorney, Agent, or Firm—Dominik, Stein, Saccocio, Reese, Colitz & Van Der Wall

[57] ABSTRACT

An apparatus relating to assembly and welding machines having multiple nests each for insertion of a part into a fixture for subsequent assembly and/or automatic welding. The apparatus comprises a pair of parallel-disposed nests which are sequentially operated allowing an operator to manually insert a part into one nest while the part in the other nest is being operated on by robotics.

8 Claims, 3 Drawing Sheets

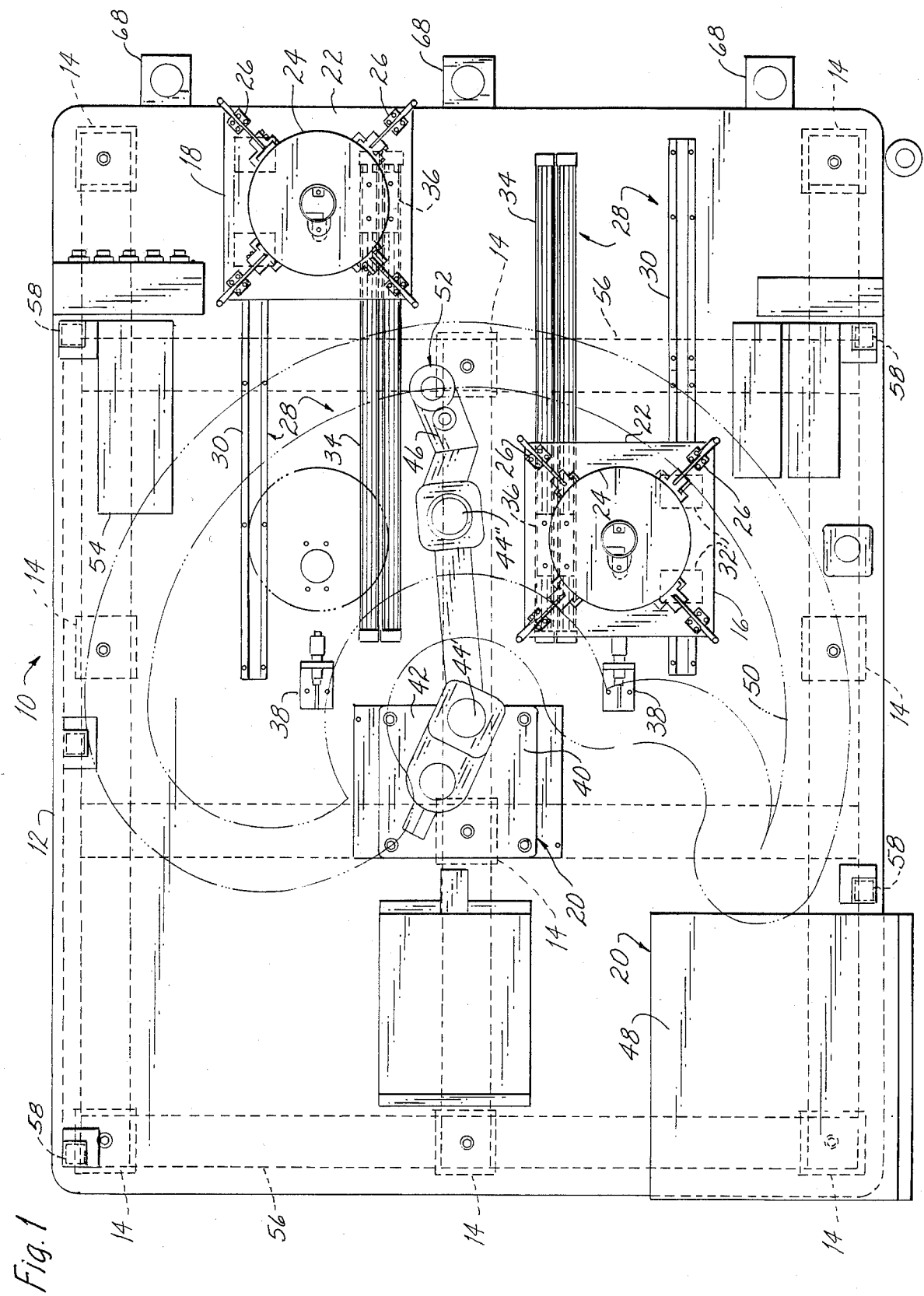

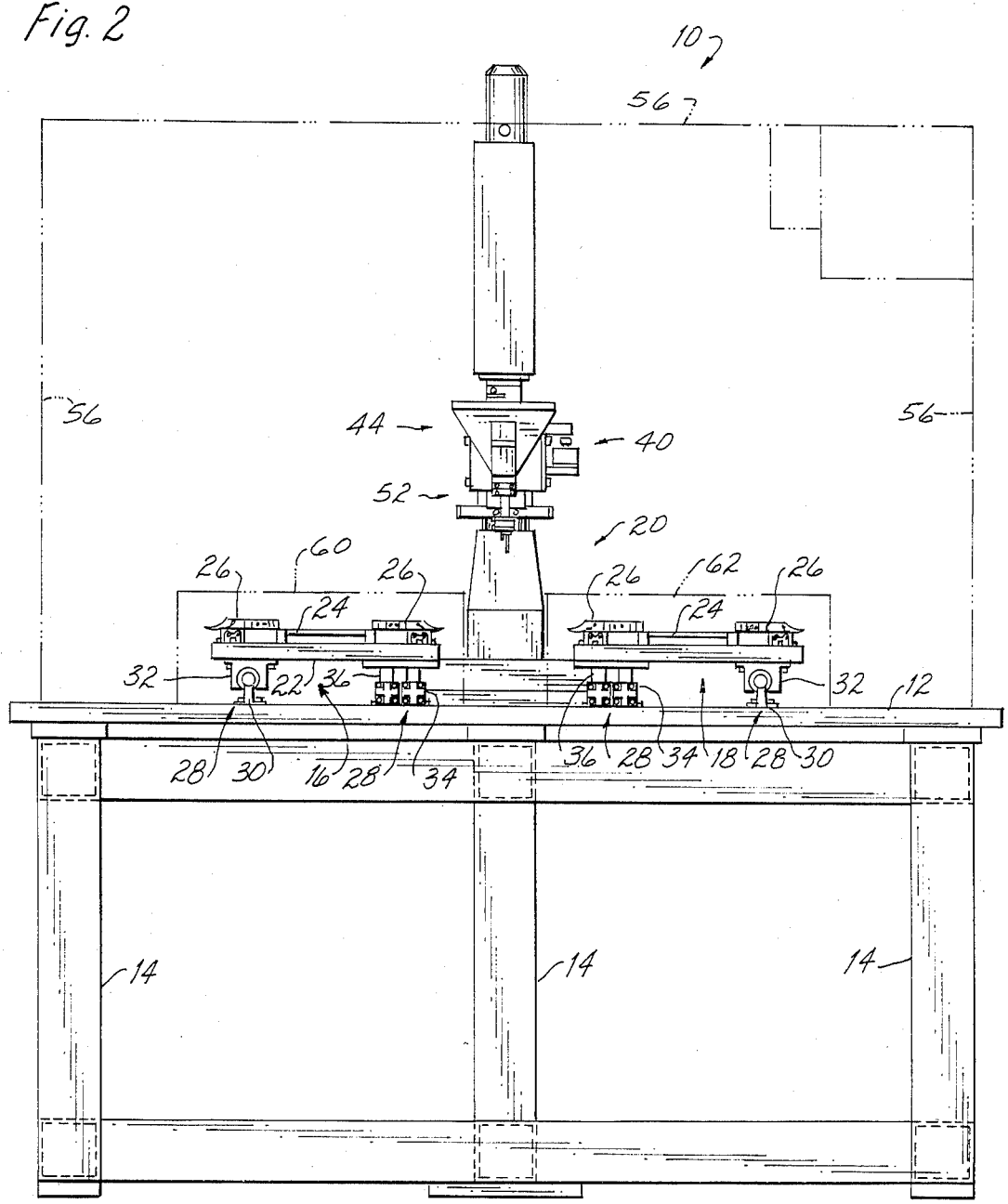

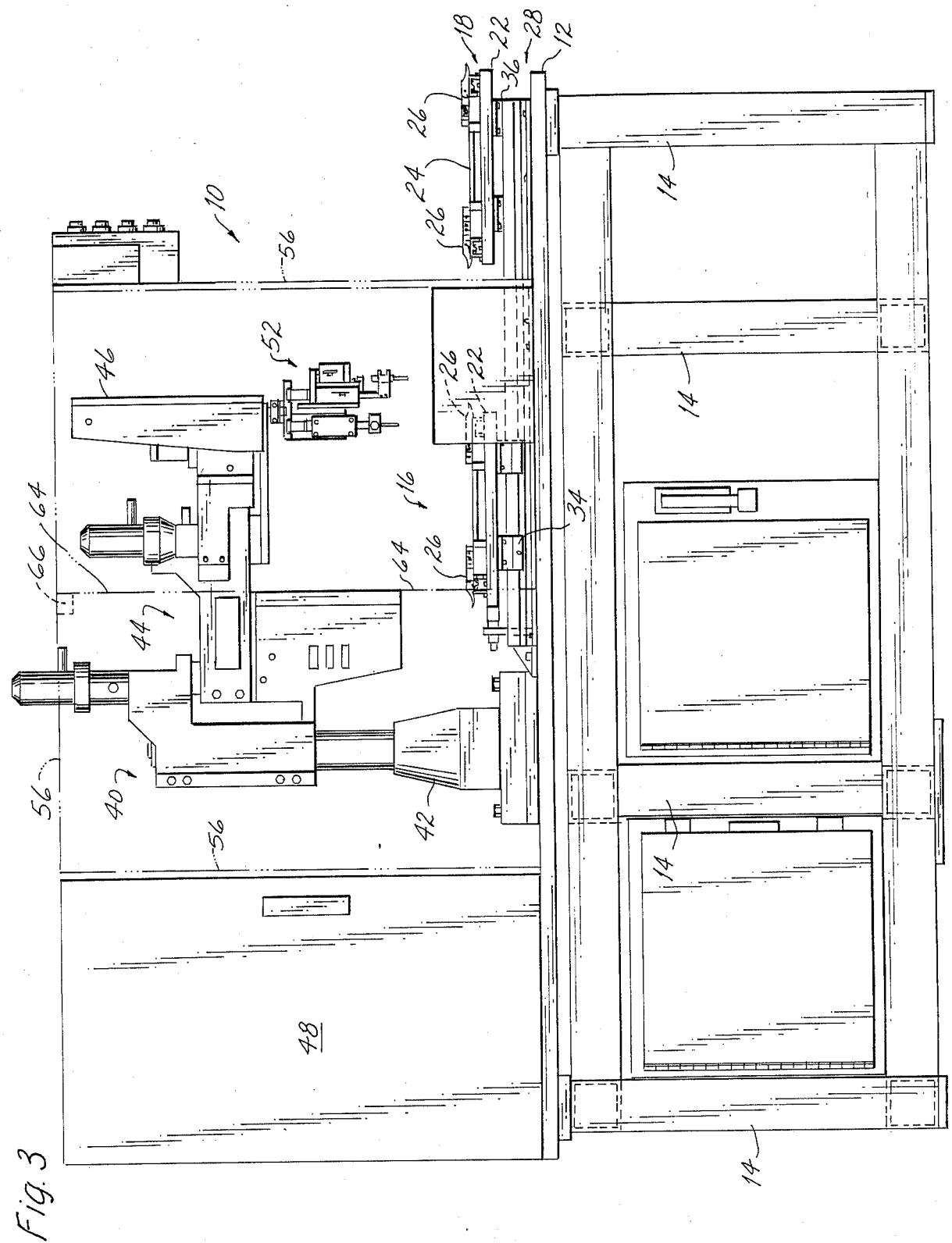

TWO STATION ROBOTIC WELDER

BACKGROUND OF THE INVENTION

1. Field of the Invention

This invention relates to assembly and welding machines. More particularly, this invention relates to assembly and welding machines having multiple nests each for manual insertion of a part into a fixture for subsequent assembly and/or automatic welding.

2. Description of the Background Art

Presently, there exist many types of assembly and welding machines having a next for receiving a part in a fixture or "jig" to securely retain the part in a properly oriented position. The part is then ready to be operated on (e.g. drilling, welding) and/or assembled with another part.

Production machines typically include multiple nests each containing a fixture to receive a part. A great number of these multiple nested machines comprise a circular design in which the nests are positioned about the periphery of a rotatable platen. An operator station is provided for the manual insertion and removal of the parts from the fixtures. A plurality of single function, such as drill presses and assembly and welding equipment, is positioned about the periphery of the rotatable platen to sequentially perform the desired operation(s) on the part as the part is indexed through its circular cycle.

Typically, due to the general nature of such circular type machines, it may become necessary to position multiple operator stations about the periphery of the machine such that different operators could manually perform different operations on the part as the parts travel through their cycle. Indeed, the general design of such machines are not readily adaptable to robotics performing a single task rapidly or multiple tasks. Consequently, the advantages of utilizing robotics is compromised when attempting to adapt robotics to presently existing assembly and welding machines. Furthermore, when such adaptation is attempted, the safety of the machine is usually also compromised to the detriment of the station operator.

Therefore, it is an object of this invention to provide an apparatus and method which overcomes the aforementioned inadequacies of the prior art devices and provides an advancement of the assembly and welding machine art.

Another object of this invention is to provide an assembly/welding machine having multiple nests accessible at a single operator station allowing a part to be mounted in a fixture in each nest for subsequent assembly and/or welding.

Another object of this invention is to provide an assembly/welding machine including robotics for performing the desired operation(s) on the part mounted within a fixture.

Another object of this invention is to provide an assembly/welding machine including a transparent cage positioned about the various components thereof to prevent injury to the operator during use.

Another object of this invention is to provide an assembly/welding machine having a pair of parallel-disposed nests which are sequentially operated allowing an operator to manually insert a part into one nest while the part in the other nest is being operated on by the robotics.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a double nested, single station, assembly and welding machine. Each nest includes a fixture adapted for receiving a part therein for assembly and/or welding. Each nest is reciprocatively mounted on a track or slide to transport the fixtured part therein from the operator station into position in the working area of a robotic manufacturing system such as the one identified as the "IBM 7545 Manufacturing System" or the like to which is mounted a tweezer or serial welder or other single function machine. A transparent, protective windowed enclosure is fitted about the entire assembly and welding machine of the invention allowing access to only the nests of the machine when the nests are fully extended to the operator's station. Consequently, the operator is precluded from contacting any of the components of the machine during use thereby minimizing inadvertent injury to the operator.

The method of the invention comprises reciprocatively and alternatively shuttling one of the nests from its extended position outside of the protective enclosure (after mounting the part in its fixture), through the windowed opening of the enclosure and into the work area of the robotic manufacturing system. Simultaneously, the other nest is moved from its retracted position within the work area of the robotic manufacturing system to its extended position in the operator's station via the windowed opening. While the operator is removing the completed part from the fixture and is mounting an incompleted part therein, the robotic manufacturing system is performing the desired operations on the fixtured part in the other nest. When the operator is finished and actuates a pair of safety switches, the extended nest is shuttled into the work area of the robotic manufacturing system while the other nest is shuttled to its extended position in the operator's station. The method may then continually and alternatively repeat itself such that a part is mounted into one nest as the other part in the other nest is operated on by the robotic manufacturing system.

It is noted that the apparatus and method of the invention effectively doubles the work output of the robotic manufacturing system because of the elimination of substantially all of the "dead time" in which the robotic manufacturing system may otherwise have expended in waiting for a new part to be positioned within its work area. Consequently, the throughput of the apparatus is effectively doubled without compromising the safety or the number of operators required.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a top plan view of the assembly and welding machine of the invention illustrating the parallel-disposed reciprocating nests, the left one of which is positioned fully retracted within the footprint area of the robotics and the other being positioned fully extended to the operator's station;

FIG. 2 is a front view of the assembly and welding machine illustrating the left and right nests in alignment with the windowed openings of the transparent enclosure; and FIG. 3 is a side view of the assembly and welding machine illustrating the extension of the right nest outside of the windowed opening of the transparent enclosure.

Similar reference characters refer to similar parts throughout the several views of the drawings.

DETAILED DESCRIPTION OF THE PREFERRED EMBODIMENT

The assembly and welding machine 10 of the invention comprises a table 12 supported by a plurality of legs 14. A left and a right nest 16 and 18 are reciprocatively mounted on the upper surface of the table 12. A robotic operation machine, generally indicated by numeral 20, is also affixed to the upper surface of table 12 to perform desired operation(s) on the parts mounted within the nests 16 and 18.

More particularly, each nest 16 and 18 comprises a base member 22 having a desired fixture 24 mounted to its upper surface for receiving a part therein for subsequent operation. As illustrated, but without limitation, fixture 24 may comprise a set of four quick-release latches 26 operable to grasp and rigidly secure a circular part therein. However, it shall be understood that the particular type or configuration of fixture 24 will vary, depending upon the part upon which operation is desired by the robotics 20.

Each base member 22 is reciprocatively mounted onto a slide, generally indicated by numeral 28, to move from an extended position near the front edge of the table 12 to a retracted position toward the robotics 20. One particular embodiment of slide 28 comprises a rail 30 on which is mounted a pair of pillow blocks 32 which are, in turn, rigidly affixed to the underside of the base member 22. A pneumatic rail 34 is positioned parallel to the fixed rail 30 to cause the base member 22 to shuttle back and forth from its extended position and its retracted position. Pneumatic rail 34 preferably comprises a pair of brackets 36 affixed to an internal pneumatic piston (not shown) operatively disposed within the pneumatic rail 34. For example, pneumatic rail 34 may comprise the pneumatic rail sold under the trademark "Origa" by the Origa Corporation of Elmhurst, Ill. Furthermore, as illustrated, utilizing the Origa cylinder Series 200, pneumatic rail 34 actually requires two pneumatic rails to accomplish the back and forth movement of the base member 22 between its extended position and its retracted position. Finally, a shock moount 38 is mounted at the rearwardmost travel of the base member 22 to cushion and control the retracted travel of the base member 22 thereby assuring precise alignment of the base member 22 in such retracted position.

Robotics 20 preferably comprises a manufacturing system 40 such as the model "IBM 7545" sold by the International Business Machines Corporation of Boca Raton, Fla. Briefly summarizing, the IBM 7545 manufacturing system 40 comprises an upwardly disposed support 42 to which is mounted a robotic arm 44 pivotable about axes 44' and 44''. An extensible head 46 is mounted at the distal end of arm 44. A robotic controller 48 is provided for computer controlling the movement of the arm 44 and the head 46. The controller 48 comprises a programmable microcomputer (not shown) with certain learning functions to repeatedly and reliably with great precision perform operation(s) on the part positioned within the fixture(s) 24 of the nests 16 and 18.

Referring specifically to FIG. 1, it is noted that the retracted-most position of the nests 16 and 18 is located within the footprint 50 of the robotics 20. Hence, full access to the part positioned within the fixture 24 of the nests 16 and 18 by the head 46 of the robotics 20 is assured.

It should be apparent that the components described above may be utilized in an almost infinite number of applications to assemble, weld, or otherwise perform operation(s) (e.g. drilling) on the part(s) mounted within fixture(s) 24 of the nests 16 and 18. Indeed, virtually any type of specific function machine may be mounted to the head 46 of the fixture 24 to perform the desired operation on the part contained therein. Further, the movability of arm 44 about axes 44' and 44'' assures that such specific function machine may perform operation(s) on the part positioned within both the fixture 24 of both nests 16 and 18. For purposes of illustration, the machine 10 of the invention may function as an assembly and welding machine by mounting a welding station, generally indicated by numeral 52 to the head 46 of the robotics 20. More specifically, welding station 52 may comprise a tweezer welding station model "TW-10" sold by Aidlin Automation Corp. of Sarasota, Fla., powered by a weld transformer 54 mounted to the surface of table 12. Hence, the two sections of the part to be assembled/welded is positioned within fixture 24 of one of the nests 16 or 18 and moved to the retracted position within the footprint 50 of the robotics 20. The robotics 20, having been preprogrammed, moves into position relative to the two sections of the part within fixture 24, to weld the two sections together.

A protective enclosure 56, preferably composed of transparent plastic, is fitted about the work area of the table 12 by means of upstanding corner posts 58. A pair of windowed openings 60 and 62 are provided at the lower front edge of the enclosure 56 to allow the nests 16 and 18 to pass therethrough to their extended position at the front edge of the table 12. The protective enclosure 56 further includes a door 64 having a cutoff switch 66 to terminate the operation of the machine 10 when the door 64 is open. Finally, a matched set of three actuator palm buttons 68 are provided at the front edge of the table 12 for actuation by the operator. It should be readily appreciated that the protective enclosure 56 prevents access to the interior components of the machine 10 by the operator except through door 64 which immediately terminates operation of the machine 10 by means of cutoff switch 66. Palm actuators 64, operable in pairs, assure that the operator's hands are positioned on the buttons 68, away from the nests 16 and 18 as the nests are shuttled back and forth from their extended to their retracted positions.

The method of the invention utilizes the basic components of the machine 10 hereinabove described. More particularly, the method of the invention comprises mounting the part within fixture 24 of one of the nests 16 (e.g. left nest 16) and securing such part within fixture 24 by means of the quick-release latches 26 or the like. Upon actuation of the two left-most actuator buttons 68 by the operator, the left nest 16 is shuttled through windowed opening 60 to its extended position within the footprint 50 of the robotics 20. Simultaneously, the right nest 18 is shuttled outwardly from its retracted position to its fully extended position along the front edge of table 12. Indeed, right nest 18 is shuttled to its extended position only while the operator continually depresses the left-most actuator buttons 68 thereby precluding inadvertent injury to the operator.

As the robotics 20 performs the desired operation on the part positioned within fixture 24 of the left nest 16, the operator removes the part from the fixture 24 of the right nest 18 and mounts a new part therein. The operator then actuates the two right-most actuator buttons 68 causing the right nest 18 to be shuttled from its extended position to its retracted position within the footprint 50 of the robotics 20. Concurrently, left nest 16 is shuttled outwardly to its extended position, thereby completing one cycle of operation.

It should be noted that use of dual, alternating nests 16 and 18 minimizes the "dead time" in which the robotics 20 would otherwise wait for another fixtured part to be presented to it and/or in which the operator would otherwise expend in waiting for another fixture 24 to be presented for unloading and loading of a new part. Thus, the use of the assembly and welding machine of the invention significantly increases the throughput of existing assembly machines.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,
What is claimed is:

1. A machine for sequentially performing an operation on a plurality of parts, comprising in combination:
    a left and right nest, each comprising a base member;
    fixture means affixed to each said base member for securely receiving one of the parts therein;
    table means;
    a pair of slide means in side by side relationship for slidably connecting said nests to said table means allowing each said nest to individually shuttle back and forth in parallel paths between an extended position at a loading and unloading operator station adjacent to one edge of the machine and a retracted position at a work area within the machine in an alternating sequence;
    robotic means including a predefined work footprint including said fully retracted positions of said nests; and
    operation means affixed to said robotic means for performing the desired robotic operation on the part mounted within said fixture of a retracted said nest, whereby a part may be loaded into the fixture of one nest while the part previously loaded into the fixture of the other nest may be operated on and then, upon actuation of said rail means, the newly loaded part is shuttled to the retracted position for being operated on while the completed part is shuttled to the extended position for unloading and reloading with a new part.

2. The machine as set forth in claim 1, further including an enclosure mounted over said table to enclose said robotic means including said predefined work footprint, said enclosure having a pair of side by side windowed openings aligned with said slide means allowing said respective nests to move therethrough to the exterior of said enclosure such that said nests are positioned exteriorly to said enclosure when in their respective extended positions.

3. The machine as set forth in claim 2, wherein a front area of said enclosure adjacent to said loading and unloading operations station is transparent allowing the operator to visually supervise the robotic operation on the parts mounted in the fixtures.

4. The machine as set forth in claim 3, wherein each said slide means comprises a fixed rail positioned on one side in parallel with a pneumatic rail means positioned on the other side of said nest, said base member of said nest including a bearing means for slidable engagement with said fixed rail and a bracket for connection with said pneumatic rail means such that operation of said pneumatic rail means causes said next to shuttle to and from said extended position and said retracted position.

5. The machine as set forth in claim 4, wherein said pneumatic rail means comprises two one-way operable pneumatic rails positioned side by side in reverse direction with one another such that one operates to shuttle said nest from said extended position to said retracted position and the other operates to shuttle said nest from said retracted position to said extended position.

6. The machine as set forth in claim 5, further including a shock mount mounted at the rearwardmost travel of said nest when in said retracted position to assure precise positioning of said nest when in said retracted position.

7. The machine as set forth in claim 6, wherein said robotic means comprises a computer programmable robotic arm pivotable about two vertical axes and an extensible head mounted to a distal end of said robotic arm, said extensible head being movable via said robotic arm within said work footprint such that the desired robotic operation may be alternatively performed on the part in one said nest in said retracted position while the part in the other said nest in said extended position is being unloaded and reloaded with a new part.

8. The machine as set forth in claim 7, wherein said slide means comprises palm actuators mounted at said extended positions of said loading and unloading operator's station requiring the operator to actuate two of said palm actuators, one with each hand, to operate said pneumatic rail means.

* * * * *